Sept. 15, 1970 R. B. LESLIE 3,528,827
MICRO-PREHEATING OF CONTAINERS
Filed Dec. 19, 1968 3 Sheets-Sheet 3
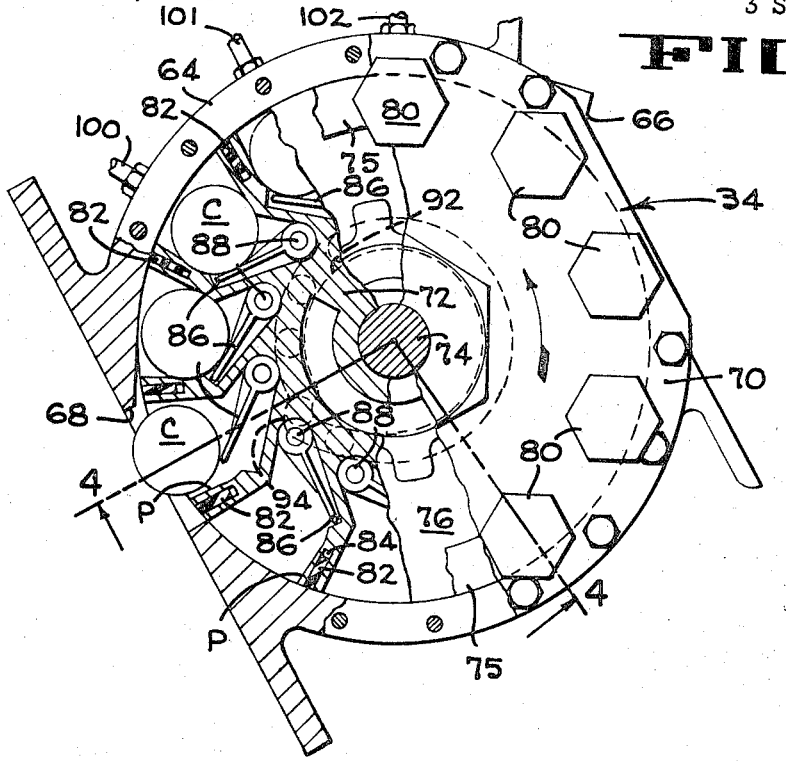
FIG_3
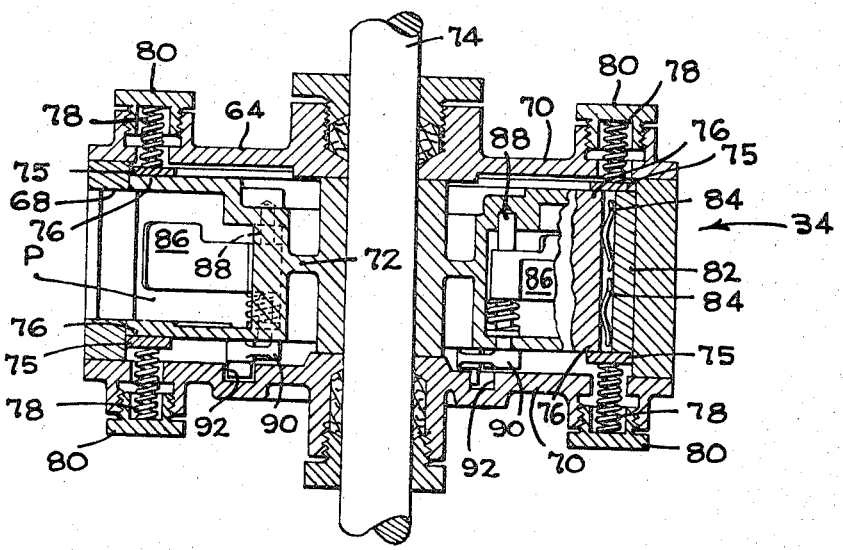
FIG_4
INVENTOR.
RICHARD B. LESLIE
BY F. W. Anderson
C. C. Trigg
ATTORNEYS United States Patent Office 3,528,827
Patented Sept. 15, 1970

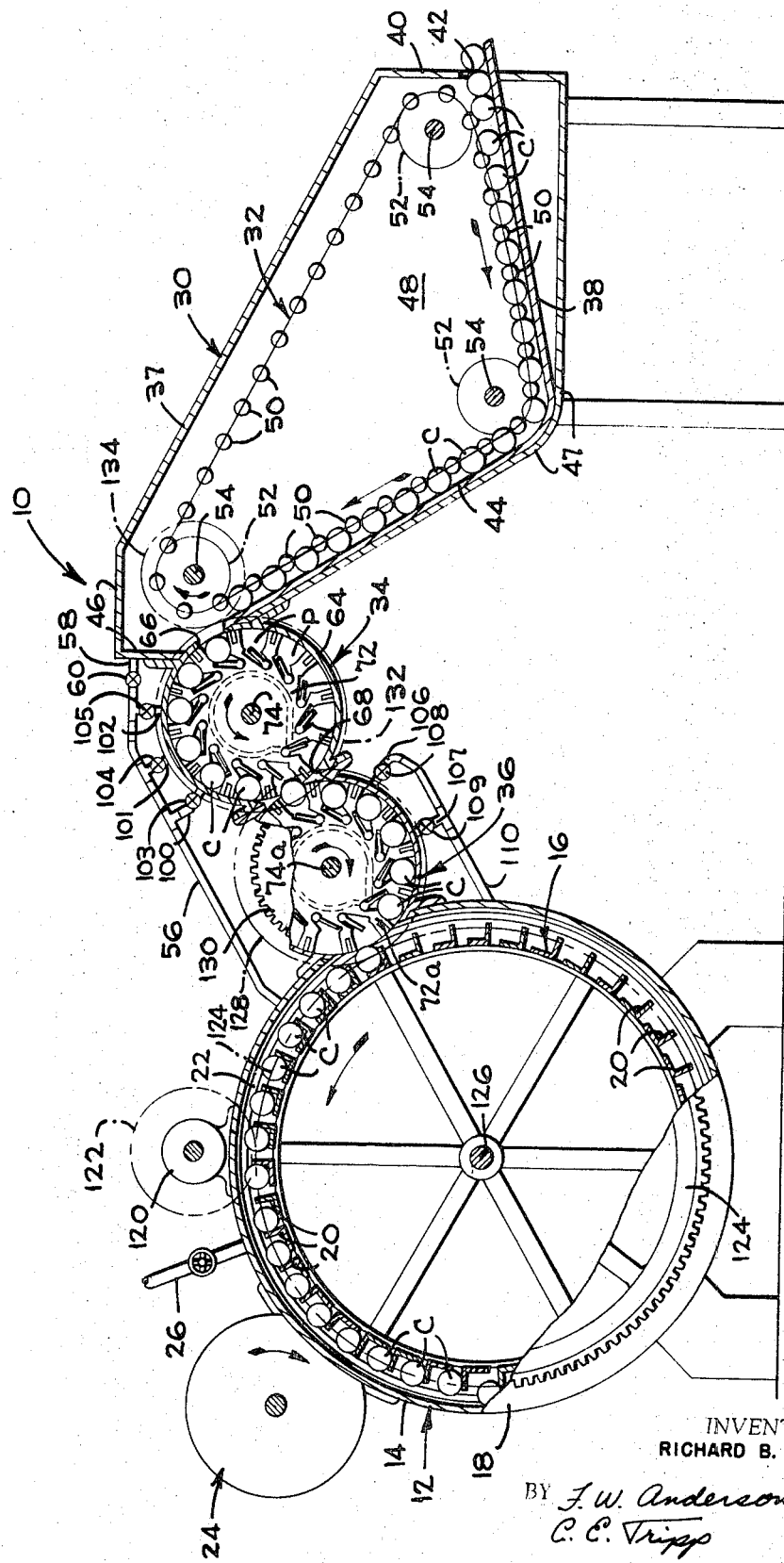

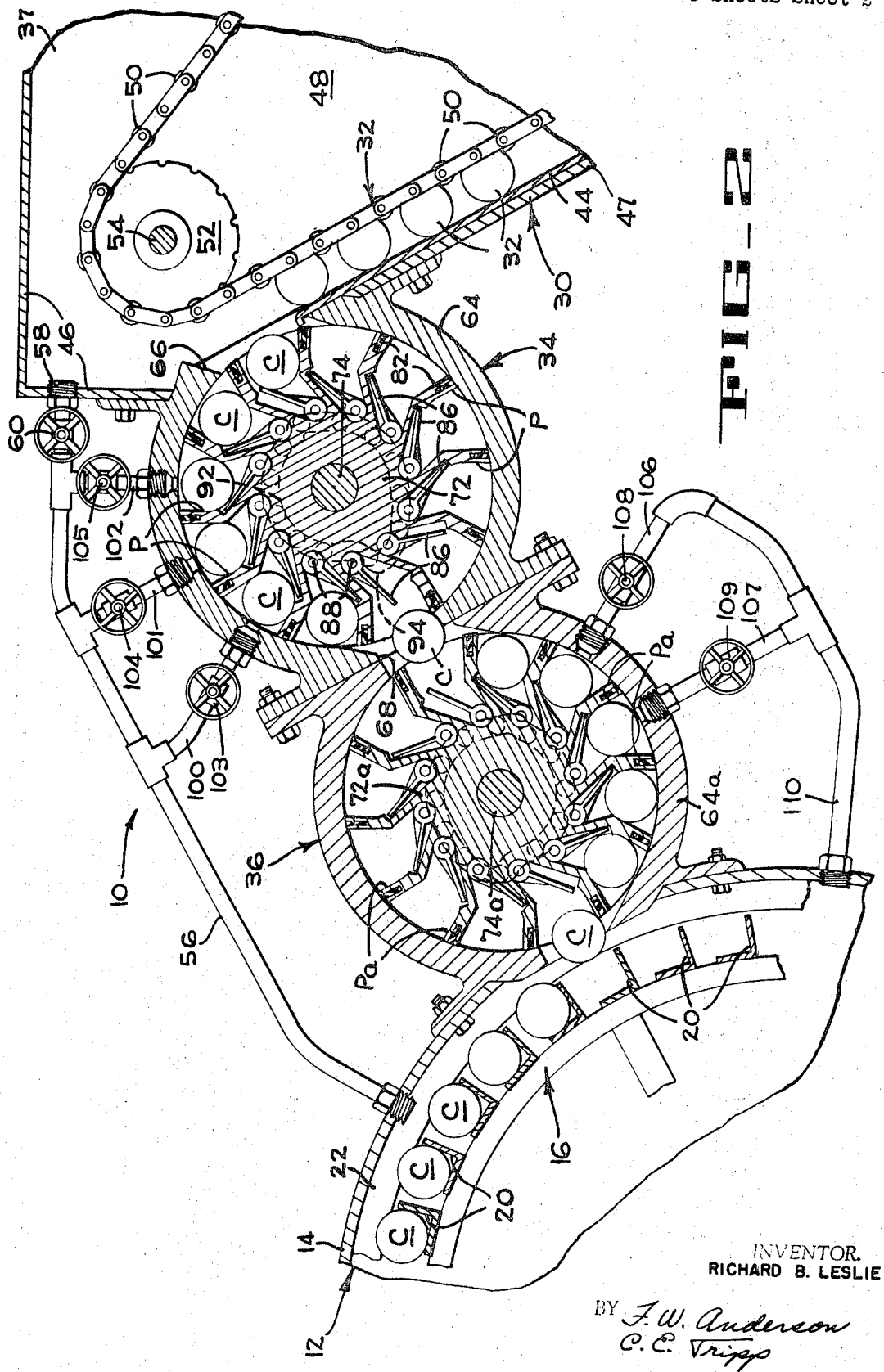

3,528,827
MICRO-PREHEATING OF CONTAINERS
Richard B. Leslie, Los Gatos, Calif., assignor to FMC Corporation, San Jose, Calif., a corporation of Delaware
Filed Dec. 19, 1968, Ser. No. 785,216
Int. Cl. A23l 3/06
U.S. Cl. 99—214                                    11 Claims

ABSTRACT OF THE DISCLOSURE

Method and apparatus for preventing paneling or buckling of containers that are rapidly entering a cooker maintained at high temperature and pressure by progressively but rapidly raising the pressure within the containers by subjecting the containers to gradually increasing temperatures and pressures before the containers enter the cooker causing aqueous vapors to form within the containers at a pressure approaching that of the pressure within the cooker. The apparatus includes a plurality of interconnected rotary pressure valves having individually sealed container accommodating pockets within which steam of progressively increasing temperature and pressure is directed.

BACKGROUND OF THE INVENTION

Reel and spiral cookers of the type disclosed herein are well known in the art as evidenced by United States Pat. No. 2,536,115 to Paul C. Wilbur. As indicated in the Wilbur patent, containers to be subjected to high temperatures and pressure in a sterilizer or cooker were first moved through one or more reel and spiral preheaters in order to gradually raise the pressure within the containers to a pressure sufficient to prevent buckling of the containers when they were introduced into the high pressure environment within the cooker. If the pressure within the cooker was high, for example, 30 to 45 p.s.i.g., and it was desired to move the containers at high speeds, the containers in the prior art devices were first moved through an atmospheric preheater and then a pressure preheater maintained at a pressure between atmospheric pressure and the pressure within the cooker thereby causing steam to gradually form within the containers. This internal steam pressure was sufficient to counteract the high cooking pressures acting on the outside surfaces of the containers when the containers entered the high pressure environment within the cooker. Thus, when operating with cooking pressures on the order of about 30 to 45 p.s.i.g., the high speed prior art devices required two expensive reel and spiral units to raise the temperature of the contents of the containers, and accordingly, the pressure within the containers, to a pressure sufficient to withstand the external pressure acting on the containers. In this way paneling or buckling of the containers was prevented when the containers were introduced into the high pressure cooking medium within the sterilizer.

High pressure reel and spiral cookers with single rotary pressure feed valves have been adapted so that the containers when passing through the single feed valves are subjected to steam at gradually increasing temperatures and pressures thus causing the pressure within the containers to increase sufficiently to prevent paneling of the containers as they enter the high pressure cooking environment within the cooker. Such valves, however, have not operated at speeds greater than about 60 containers per minute because of practical size limitations of the rotary pressure valves.

The practical size of rotary pressure feed valves are limited because the housings of such valves must be reinforced, at substantial expense, to handle the high steam pressures within the cooker to safeguard against the possibility that the pocket seals should become defective and the entire pressure within the cookers should be subjected to the side walls of the valves. For this and other reasons it is desirable to provide small pressure valves that are about 20 inches in outside diameter and are much less expensive than the large valves.

SUMMARY OF THE INVENTION

The micro-preheating method and apparatus of the present invention utilizes two or more interconnected rotary pressure valves thereby permitting the speed to be increased to at least 150 cans per minute and up to about 450 cans per minute. The rotary pressure valves are of the type disclosed in the patent to Thompson 1,978,656 which includes driven pocketed rotors that have individual container receiving pockets therein sealed to the valve housing walls. The containers enter the pockets of the valves through a shrouded housing that is open to the atmosphere and has steam at atmospheric pressure therein. A plurality of valved steam conduits communicating with the pockets through openings in the valve housings are controlled so that steam is directed into the pockets at temperatures and pressures which progressively increase in the direction of movement of the containers. The residence time of the containers in the pockets is sufficient to progressively raise the pressure within the containers to a temperature and pressure which precludes paneling or buckling of the containers when the containers move into the pressure cooker.

BRIEF DESCRIPTION OF THE DRAWINGS

FIG. 1 is a diagrammatic vertical section taken through the micro-preheating apparatus of the present invention, certain parts of the cooker being shown in end elevation.

FIG. 2 is an enlarged vertical section taken through the micro-preheating apparatus, a fragment of the cooker and a fragment of the shrouded housing.

FIG. 3 is an enlarged side elevation of one of the rotary pressure valves with parts broken away to illustrate internal mechanism thereof.

FIG. 4 is a section taken along lines 4—4 of Fig. 3 showing the structure for individually sealing each turret pocket to its associated housing.

DESCRIPTION OF THE PREFERRED EMBODIMENT

The micro-preheating apparatus 10 (FIGS. 1 and 2) of the present invention is associated with a reel and spiral cooker 12 of well known design. The cooker 12 includes an elongated cylindrical pressure housing 14 having a reel 16 journaled in end plates 18 (only one shown) that are sealed in pressure tight relationship to the housing. The reel carries a plurality of equally spaced reel pockets in the form of angle bars 20 on its periphery. Containers C are directed into the angle bars by the micro-preheating apparatus 10 near one end of the cooker 12, and are engaged by a spiral track 22 that is fixed to the housing 14 and gradually moves the containers to the other end of the cooker in response to rotation of the reel 16. The containers are subsequently discharged from the cooker 12 by a rotary pressure discharge valve 24 of well known design. A valved steam conduit 26 is connected between the housing 14 and a source of steam under pressure of about 32 to 45 p.s.i.g. and a temperature of about 276° F. to 292° F..

The micro-preheating apparatus 10 comprises a shrouded atmospheric preheater 30 having an endless free roller feed conveyor 32 therein. The conveyor 32 moves the containers into a plurality of rotary pressure valves, two such valves 34 and 36 being illustrated in FIGS. 1 and 2. The preheater is connected to the valve 34, and the valve 34 is connected to the valve 36 which is connected to the inlet opening of the cooker 12 and directs the containers into the reel pockets 20 of the cooker.

The atmospheric preheater 30 comprises a housing 37 that includes a downwardly inclined floor plate 38, an end wall 40 having an inlet opening 42 therein, an upwardly inclined floor plate 44 which communicates with the valve 34, an upper wall 46, a lower wall 47 and two side walls 48, only one of which is shown. The containers pass at random through the inlet opening 42 of the housing 37 and are separated by evenly spaced individual containers.

The conveyor 32 is trained around sets of sprockets 52 mounted on shafts 54 journaled in the housing 37 and is driven in the direction indicated by the arrows in FIG. 1. While containers are moving through the preheater 30, they are subjected to steam at atmospheric pressure. The steam entering the preheater 30 is preferably received from the cooker 12 and flows through a manifold 56 and conduit 58 having a pressure controlling needle valve 60 therein. Thus, the container walls are preheated as they are moved into the rotary pressure valve 34.

The rotary pressure valve 34 (FIGS. 1, 2, 3 and 4) comprises a pressure housing 64 having an inlet opening 66, a discharge opening 68, and end walls 70 (FIGS. 3 and 4). A pocketed rotor 72 is keyed to a shaft 74 journaled in the housing side walls. The rotor 72 includes a plurality of container accommodating pockets P on its periphery which are individually sealed to the housing walls by sealing rings 75 urged against the rotor side walls 76 by springs 78 held in position by caps 80 screwed into the side walls. Sealing strips 82 are fitted in slots in the pocket legs and are urged outwardly into sealing engagement against an annular surface of the housing walls by springs 84 (FIG. 4).

In order to positively discharge the containers from each pocket P, a paddle 86 is connected to a shaft 88 that is pivotally mounted in each pocket P. Each paddle is normally held in an inactive position against the pocket walls during most of its travel but is pivoted outwardly to discharge the container from the pocket when the pocket is registered with the discharge opening 68. Pivotal movement of the paddle is accomplished by the lever 90 (FIG. 4) secured to the shaft 88 and having a cam follower on one end that rides in an annular cam track 92 having lobes 94 (FIG. 3) therein. Thus, each individual pocket and container therein is sealed in pressure tight relationship to the housing walls.

The rotary pressure valve 36 is substantially the same as the rotary valve 34 and, accordingly, will not be described in detail. Parts of the valve 36 which are similar to the valve 34 will be assigned the same numerals followed by the letter "a."

As indicated in FIG. 2, conduits 100, 101 and 102 having pressure controlling needle valves 103, 104 and 105 therein are connected at spaced points around the periphery of the housing 64 and to the steam manifold 56. Similarly, conduits 106 and 107 having needle valves 108 and 109 therein are connected between the housing 64a of the rotary valve 36 and a manifold 110 that communicates with steam in the cooker 12. Pressure gauges (not shown) may be associated with each needle valve to indicate the pressure of the steam entering the micro-preheating apparatus 10.

The needle valves are set so as to progressively increase the pressure and temperature of the steam entering the pockets P and Pa as the pockets move the containers toward the cooker 12. For example, if the cooker is being operated at a temperature of about 290° F. and 45 p.s.i.g.; the needle valve 105 would be set for 8 p.s.i.g. (2350° F.), the needle valve 104 would be set for 16 p.s.i.g. (252° F.), the needle valve 103 would be set for 24 p.s.i.g. (265° F.), the needle valve 108 would be set for 32 p.s.i.g. (276° F.), and the needle valve 109 would be set for 40 p.s.i.g. (285° F.)

The reel 16, rotors 72a and 72 and feed conveyor 32 are driven in timed relation in the directions shown by the arrows by a drive train that is diagrammatically illustrated in FIG. 1. The drive train receives power from a motor 120 which has a drive gear 122 thereon that meshes with a bull gear 124 secured to the shaft 126 of the reel 16. The rotor 72a of the pressure valve 36 is driven by a gear 128 that meshes with the bull gear 124. The rotor 72 of the pressure valve 36 is driven by a gear drive 130 (only a portion being shown) that includes equal size gears secured to the shafts 74 and 74a, and the conveyor 32 is driven by gears 132 and 134 interconnecting the shafts 74 and 54. The rotor of the discharge valve 24 is driven by a gear train (not shown) at the other end of the machine.

Tests have been conducted with standard dog food cans which are 90 pound plain body cans with 90 pound ends and are of the 307 x 509 size, i.e. 3$\frac{7}{16}$ inches in diameter and 5$\frac{9}{16}$ inches in length. Tests have also been conducted with national beaded 85 pound body cans, and with national beaded 75 pound body cans of the same size indicated above. In all of these tests the cans were filled with a food product at about 190° F. and the sterilizing temperature in the cooker was 276 degrees F. at 32 p.s.i.g. It was determined that no paneling occurred with any of the above cans when the cans had a residence time within the sealed pockets of a rotary pressure valve of 4 seconds or above. Residence times less than four seconds caused paneling when using the lighter 75 pound cans. When unheated air, rather than steam was added to the pockets at approximately the same pressure increments as used with the steam, all containers paneled when the residence time was 8 seconds and the sterilizing pressure was 32 p.s.i.g. which corresponds to a steam pressure about 276° F. as indicated above.

The above tests indicate that by progressively raising the pressure and temperature acting on the outside walls of the containers when they are sealed within the pockets of rotary pressure valves and are moving toward the cooker 12, that the external heat causes the aqueous vapors within the containers to rapidly rise in temperature and pressure thereby preventing paneling of the containers when the containers are eventually moved into the high pressure and high temperature environment within the cooker.

Since each rotor is about 20 inches in diameter and the rotor pockets P and Pa maintain each container under superatmospheric conditions for about 330° of travel through the valves 34 and 36, it follows that two rotary valves will provide more than four seconds residence time when the containers are moving at the rate of about 150 containers per minute. This residence time under gradually increasing superatmospheric pressure plus the additional heating accomplished during the travel of the containers through the preheater 30 will raise the pressure within the container sufficiently to withstand a 45 p.s.i.g. pressure in the cooker 12 without causing damage to containers of the types indicated above.

If it is desired to move the containers through the cooker at higher speeds, or if it is desired to use containers having thinner walls, or containers constructed of different material such as aluminum or plastics, it is within the scope of the invention to insert one or more valves between the valve 36 and the preheater 30 to accommodate such conditions.

From the foregoing description it is apparent that the micro-preheating method and apparatus of the present invention includes a plurality of communicating rotary pressure valves having individually sealed container accommodating pockets which are subjected to steam at progressively increasing pressures and temperatures thereby progressively raising the aqueous vapor pressure within the containers to an amount which prevents collapsing or paneling of the containers when they are introduced into the high pressure environment of a pressure cooker.

Although the best mode contemplated for carrying out the present invention has been herein shown and described, the subject matter which is regarded as the invention is set forth in the appended claims.

Having completed a detailed description of the invention so that those skilled in the art could practice the same, I claim:

1. An apparatus for rapidly preheating containers prior to entry into a cooker having a heating medium therein maintained at high pressure and temperature, comprising a plurality of interconnected rotary pressure valves arranged to move the containers in a predetermined direction along arcuate paths, and means for directing steam against the containers at a plurality of locations as the containers move along said arcuate paths with the pressure and temperature of the steam progressively increasing in the direction of movement of the containers for generating a pressure within the containers sufficiently high to preclude paneling of the containers when they enter said high pressure cooking medium.

2. An apparatus according to claim 1 wherein each of said rotary pressure valves includes a driven rotor having container accommodation pockets therein, and wherein each pocket is sealed in pressure tight relationship from the next adjacent pocket.

3. An apparatus according to claim 1 and additionally comprising a housing having an inlet opening and a discharge opening communicating with one of said rotary valves, a driven conveyor in said housing for receiving containers from said inlet opening and for advancing the containers one at a time through said housing and into said one rotary valve, and means for directing steam at about 212° F. into said housing to preheat the containers.

4. An apparatus according to claim 3 wherein each of said rotary pressure valves includes a driven rotor having container accommodating pockets therein, and wherein each pocket is sealed in pressure tight relationship from the next adjacent pockets.

5. An apparatus according to claim 1 wherein the means for directing steam against the containers includes a plurality of pressure regulating means for independently varying the amount of pressure in each of said locations so as to adapt the apparatus to process containers of different wall strengths and to preheat containers to withstand deformation under different cooking pressures.

6. The method of cooking canned food products comprising of feeding the cans along an S-shaped path while subjecting them to successively higher superatmospheric steam pressures and temperatures from an initial atmosphere pressure to a steam pressure and temperature substantially as high as the cooking pressure, and thereafter directly cooking the cans under a superatmospheric steam pressure that is not less than the highest pressure encountered along said S-shaped path.

7. A method of rapidly preheating containers prior to entry into a cooker maintained at a high temperature and pressure comprising the steps of moving the containers along a first arcuate path, confining each container in pressure tight relationship relative to other containers while moving along said first path in a predetermined direction, transferring the confined containers to a second arcuate path, confining each container in pressure tight relationship relative to other containers while moving along said second path in a predetermined direction, discharging the containers from said paths into a cooking medium maintained at a high temperature and pressure, and directing steam against the confined containers as the containers move along said arcuate paths with the pressure and temperature of the steam progressively increasing in the direction of movement of the containers for generating a pressure inside the containers which becomes sufficiently high to preclude paneling of the containers when introduced into said high pressure cooking medium.

8. A method according to claim 7 and additionally including the step of preheating the containers with steam at atmospheric pressure prior to moving the containers into said first arcuate path.

9. A method according to claim 7 wherein the maximum steam pressure directed against the containers as the containers move along said arcuate paths is about 5 p.s.i.g. less than the pressure of said cooking medium.

10. A method according to claim 7 wherein the pressure of said cooking medium is about 45 p.s.i.g. and wherein the steam directed against the containers as the containers move along said arcuate paths reaches a maximum pressure of about 40 p.s.i.g.

11. A method according to claim 7 wherein the residence time of the containers in said first and second arcuate paths is greater than about 4 seconds.

References Cited

UNITED STATES PATENTS

| 1,976,754 | 10/1934 | Thompson | 99—366 |
| 2,029,303 | 2/1936 | Ball | 99—182 |
| 2,468,794 | 5/1949 | Wilbur | 99—361 X |
| 2,676,891 | 4/1954 | Wilbur | 99—214 |
| 3,252,405 | 5/1966 | Mencacci | 99—214 X |

TIM R. MILES, Primary Examiner

U.S. Cl. X.R.

99—361, 366

UNITED STATES PATENT OFFICE
CERTIFICATE OF CORRECTION

Patent No. 3,528,827           Dated SEPTEMBER 15, 1970

Inventor(s) R. B. LESLIE

It is certified that error appears in the above-identified patent and that said Letters Patent are hereby corrected as shown below:

Column 3, line 12:  after "spaced" insert --free rollers 50 of the conveyor 32 into spaced--;

line 73:  delete "2350°" and insert --235°--.

Signed and sealed this 31st day of August 1971.

(SEAL)
Attest:

EDWARD M. FLETCHER, JR.
Attesting Officer

WILLIAM E. SCHUYLER, JR.
Commissioner of Patents